(12) United States Patent
Kleiman et al.

(10) Patent No.: US 7,328,305 B2
(45) Date of Patent: Feb. 5, 2008

(54) DYNAMIC PARITY DISTRIBUTION TECHNIQUE

(75) Inventors: Steven R. Kleiman, Los Altos, CA (US); Robert M. English, Menlo Park, CA (US); Peter F. Corbett, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 409 days.

(21) Appl. No.: 10/700,227

(22) Filed: Nov. 3, 2003

(65) Prior Publication Data

US 2005/0097270 A1    May 5, 2005

(51) Int. Cl.
*G06F 12/00* (2006.01)

(52) U.S. Cl. .................. 711/114; 714/6; 714/758; 714/800; 714/801; 714/802; 714/803; 714/804; 714/805

(58) Field of Classification Search ............. 711/113, 711/114; 714/5, 6, 701, 770, 800
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |

(Continued)

OTHER PUBLICATIONS

Patterson et al., A Case for Redundant Arrays of Inexpensive Disks (RAID), ☐☐Dept. of Elect. Engr. and Computer Sciences, Univ. of Cal., Berkeley, 1988 ACM ☐☐0-89791-268-3/88/006/0109, pp. 109-116.*

(Continued)

*Primary Examiner*—Matthew Kim
*Assistant Examiner*—Hetul Patel
(74) *Attorney, Agent, or Firm*—Cesari and McKenna, LLP

(57) ABSTRACT

A dynamic parity distribution system and technique distributes parity across disks of an array. The dynamic parity distribution system includes a storage operating system that integrates a file system with a RAID system. In response to a request to store (write) data on the array, the file system determines which disks contain free blocks in a next allocated stripe of the array. There may be multiple blocks within the stripe that do not contain file system data (i.e., unallocated data blocks) and that could potentially store parity. One or more of those unallocated data blocks can be assigned to store parity, arbitrarily. According to the dynamic parity distribution technique, the file system determines which blocks hold parity each time there is a write request to the stripe. The technique alternately allows the RAID system to assign a block to contain parity when each stripe is written.

51 Claims, 2 Drawing Sheets

U.S. PATENT DOCUMENTS

| | | | |
|---|---|---|---|
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,657,468 | A * | 8/1997 | Stallmo et al. ............. 711/114 |
| 5,805,788 | A | 9/1998 | Johnson |
| 5,812,753 | A | 9/1998 | Chiariotti |
| 5,862,158 | A | 1/1999 | Baylor et al. |
| 5,884,098 | A | 3/1999 | Mason, Jr. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,532,548 | B1 | 3/2003 | Hughes |
| 6,557,123 | B1 * | 4/2003 | Wiencko et al. ............. 714/701 |
| 6,571,326 | B2 * | 5/2003 | Spiegel et al. .............. 711/170 |
| 6,581,185 | B1 | 6/2003 | Hughes |
| 2002/0083037 | A1 | 6/2002 | Lewis et al. |
| 2002/0124137 | A1* | 9/2002 | Ulrich et al. ............... 711/113 |
| 2003/0126523 | A1 | 7/2003 | Corbett et al. |

OTHER PUBLICATIONS

William R. Stanek. "Microsoft Windows 2000 Server: Administering Volume Sets and RAID Arrays" Jan. 10, 2006. (Printed 1999)☐☐(http://www.microsoft.com/technet/prodtechnol/windows2000serv/maintain/operate/11w2kada.mspx).*
Microsoft Computer Dictionary, 5th Edition, 2002, p. 211.*
Anvin, Peter H, "*The Mathematics of RAID 6*," Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks*, Technical Memorandum 45312-891206-01TM, AT&T, Bell Laboratories, Department 45312, Holmdel, NJ, Dec. 1989.
Bitton, Dina, *Disk Shadowing*, Proceedings of the 14$^{th}$ VLDB Conference, LA, CA (1988).
Bultman, David L., *High Performance SCSI Using Parallel Drive Technology*, In Proc. BUSCON Conf., pp. 40-44, Anaheim, CA, Feb. 1988.
Chen, Peter et al., *Two Papers on RAIDs*. Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890*, Performance Evaluation, pp. 74-85, 1990—check to see if exact same copy as one in WAFL.
Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.
Chen, Peter M., et al., *RAID:High Performance, Reliable Secondary Storage*, ACM Computing Surveys, 26(2):145-185, Jun. 1994.
Chervenak, Ann L., *Performance Measurement of the First RAID Prototype*, Technical Report UCB/CSD 90/574, Computer Science Division (EECS), University of California, Berkeley, May 1990.
Copeland, George, et al., "*A Comparison of High-Availability Media Recovery techniques,*" in Proc. ACM-SIGMOD Int. Conf. Management of Data, 1989.
Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.
Evans *The Tip of the Iceberg:RAMAC Virtual Array—Part I*, Technical Support, Mar. 1997, pp. 1-4.
Kim, Michelle Y., *Synchronized Disk Interleaving*, IEEE Transactions on Computers, C-35(11):978-988, Nov. 1986.
Kim, Michelle, et al., *Asynchronous Disk Interleaving Approximating Access Delays*, IEEE Transactions on Computers, vol. 40, No. 7, Jul. 1991, pp. 801-810.
Lawlor, F. D., *Efficient Mass Storage Parity Recovery Mechanism*, IBM Technical Disclosure Bulletin 24(2):986-987, Jul. 1981.
Lee, Edward K., et al., *RAID-II: A Scalable Storage Architecture for High-Bandwidth Network File Service*, Technical Report UCB/CSD 92/672, (Feb. 1992).
Li, Don, et al., *Authors' Reply*, IEEE Transactions on Communications, 46:575, May 1998.
Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.
Meador, Wes E., *Disk Array Systems*, Proceedings of COMPCON, 1989, pp. 143-146.
Ng, Spencer, et al., *Trade-Offs Between Devices and Paths in Achieving Disk Interleaving*, IEEE International Symposium on Computer Architecture, 1988, pp. 196-201.
Ng, Spencer, *Some Design Issues of Disk Arrays*, Proceedings of COMPCON Spring '89, pp. 134-142. IEEE, 1989.
Park, Arvin, et al., *Providing Fault Tolerance In Parallel Secondary Storage Systems*, Technical Reports CS-TR-057-86, Princeton, Nov. 1986.
Patel, Arvind M., *Adaptive Cross-Parity (AXP) Code for a High-Density Magnetic Tape Subsystem*, IBM Technical Disclosure Bulletin 29(6):546-562, Nov. 1985.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 (Sep. 1988).
Gibson, Garth A., et al., *Coding Techniques for Handling Failures in Large Disk Arrays*, Technical Report UCB/CSD 88/477, Computer Science Division, University of California, (Jul. 1988.).
Gibson, Garth A., et al., *Failure Correction Techniques for Large Disk Arrays*, In Proceedings Architectural Support for Programming Languages and Operating Systems, Boston, Apr. 1989, pp. 123-132.
Gibson, Garth A., et al., *Strategic Directions in Storage I/O Issues in Large-Scale Computing*, ACM Computing Survey, 28(4):779-93, Dec. 1996.
Goldick, Jonathan S., et al., *Multi-resident AFS: An Adventure in Mass Storage*, In Proceedings of the 1995 USENIX Technical Conference, pp. 47-58, Jan. 1995.
Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., High Performance RAIT, *Tenth NASA Goddard Conference on Mass Storage Systems and Technologies and Nineteenth IEEE Symposium on Mass Storage Systems*, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, Dec. 1989.

Kent, Jack et al., Optimizing Shadow Recovery Algorithms, *IEEE Transactions on Software Engineering*, 14(2):155-168, Feb. 1988.

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture,"catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?* , Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14$^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekrom—"About RAID 6", 2004.

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

\* cited by examiner

DYNAMIC PARITY DISTRIBUTION TECHNIQUE

FIELD OF THE INVENTION

The present invention relates to arrays of storage systems and, more specifically, to a system that efficiently assigns parity blocks within storage devices of a storage array.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" that comprises a cluster of physical disks, defining an overall logical arrangement of disk space. The disks within a volume are typically organized as one or more groups, wherein each group may be operated as a Redundant Array of Independent (or Inexpensive) Disks (RAID). In this context, a RAID group is defined as a number of disks and an address/block space associated with those disks. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information as a hierarchical structure of directories, files and blocks on the disks. For example, each "on-disk" file may be implemented as set of data structures, i.e., disk blocks, configured to store information, such as the actual data for the file. The storage operating system may also implement a storage module, such as a disk array controller or RAID system, that manages the storage and retrieval of the information to and from the disks in accordance with write and read operations. There is typically a one-to-one mapping between the information stored on the disks in, e.g., a disk block number space, and the information organized by the file system in, e.g., volume block number space.

A common type of file system is a "write in-place" file system, an example of which is the conventional Berkeley fast file system. In a write in-place file system, the locations of the data structures, such as data blocks, on disk are typically fixed. Changes to the data blocks are made "in-place"; if an update to a file extends the quantity of data for the file, an additional data block is allocated. Another type of file system is a write-anywhere file system that does not overwrite data on disks. If a data block on disk is retrieved (read) from disk into a memory of the storage system and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

Most RAID implementations enhance the reliability/integrity of data storage through the redundant writing of data "stripes" across a given number of physical disks in the RAID group, and the appropriate storing of redundant information with respect to the striped data. The redundant information, e.g., parity information, enables recovery of data lost when a disk fails. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block contains data ("data blocks"), while one block contains parity ("parity block") computed by the XOR of all the data.

As used herein, the term "encoding" means the computation of one or more redundancy values over a predetermined subset of data blocks, whereas the term "decoding" means the reconstruction of one or more data or parity blocks by the same process as the redundancy computation using a subset of data blocks and redundancy values. A typical method for calculating a redundancy value involves computing a parity value by XORing the contents of all the non-redundant blocks in the stripe. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

If the parity blocks are all stored on one disk, thereby providing a single disk that contains all (and only) parity information, a RAID-4 level implementation is provided.

The RAID-4 implementation is conceptually the simplest form of advanced RAID (i.e., more than striping and mirroring) since it fixes the position of the parity information in each RAID group. In particular, a RAID-4 implementation provides protection from single disk errors with a single additional disk, while making it easy to incrementally add data disks to a RAID group.

If the parity blocks are contained within different disks in each stripe, usually in a rotating pattern, then the implementation is RAID-5. Most commercial implementations that use advanced RAID techniques use RAID-5 level implementations, which distribute the parity information. A motivation for choosing a RAID-5 implementation is that, for most read-optimizing file systems, using a RAID-4 implementation would limit write throughput. Such read-optimizing file systems tend to scatter write data across many stripes in the disk array, causing the parity disks to seek for each stripe written. However, a write-anywhere file system, such as the WAFL file system, does not have this issue since it concentrates write data on a few nearby stripes.

While a write-anywhere file system eliminates the write performance degradation normally associated with RAID-4, the fact that one disk is dedicated to parity storage means that it does not participate in read operations, reducing read throughput. Although this effect is insignificant for large RAID group sizes, those group sizes have been decreasing primarily because of two reasons, both of which relate to increasing sizes of disks. Larger disks take longer to reconstruct after failures, increasing the vulnerability of the disk array to a second failure. This can be countered by decreasing the number of disks in the array. Also, for a fixed amount of data, it takes fewer larger disks to hold that data. But this increases the fraction of disks unavailable to service read operations in a RAID-4 configuration. The use of a RAID-4 level implementation may therefore result in significant loss of read operations per second.

When a new disk is added to a full RAID-4 volume, the write anywhere file system tends to direct most of the write data traffic to the new disk, which is where most of the free space is located. A RAID-5 level implementation would do a better job of distributing read and write load across the disks, but it has the disadvantage that the fixed pattern of parity placement makes it difficult to add disks to the array.

Therefore, it is desirable to provide a parity distribution system that enables a storage system to distribute parity evenly, or nearly evenly, among disks of the system.

In addition, it is desirable to provide a parity distribution system that enables a write anywhere file system of a storage system to run with better performance in smaller (RAID group) configurations.

SUMMARY OF THE INVENTION

The present invention overcomes the disadvantages of the prior art by providing a dynamic parity distribution system and technique that distributes parity across disks of an array. The dynamic parity distribution system includes a storage operating system that integrates a file system with a RAID system. In response to a request to store (write) data on the array, the file system determines which disks contain free blocks in a next allocated stripe of the array. There may be multiple blocks within the stripe that do not contain file system data (i.e., unallocated data blocks) and that could potentially store parity (redundant information). One or more of those unallocated data blocks can be assigned to store parity, arbitrarily. According to the dynamic parity distribution technique, the file system determines which blocks hold parity each time there is a write request to the stripe. The technique alternately allows the RAID system to assign a block to contain parity when each stripe is written.

In the illustrative embodiment, the file system maintains at least one unallocated block per stripe for use by the RAID system. During block allocation, the file system provides an indication to the RAID system of the unallocated block(s) to be used to store parity information. All unallocated blocks on the disks of the array are suitable candidates for file system data or parity. Notably, the unallocated block(s) used to store parity may be located in any disk and the location(s) of the unallocated block(s) can change over time. The file system knows, i.e., maintains information, about the locations of allocated data so that it can leave (reserve) sufficient space for parity in every stripe. The file system illustratively maintains this knowledge through block allocation information data structures.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
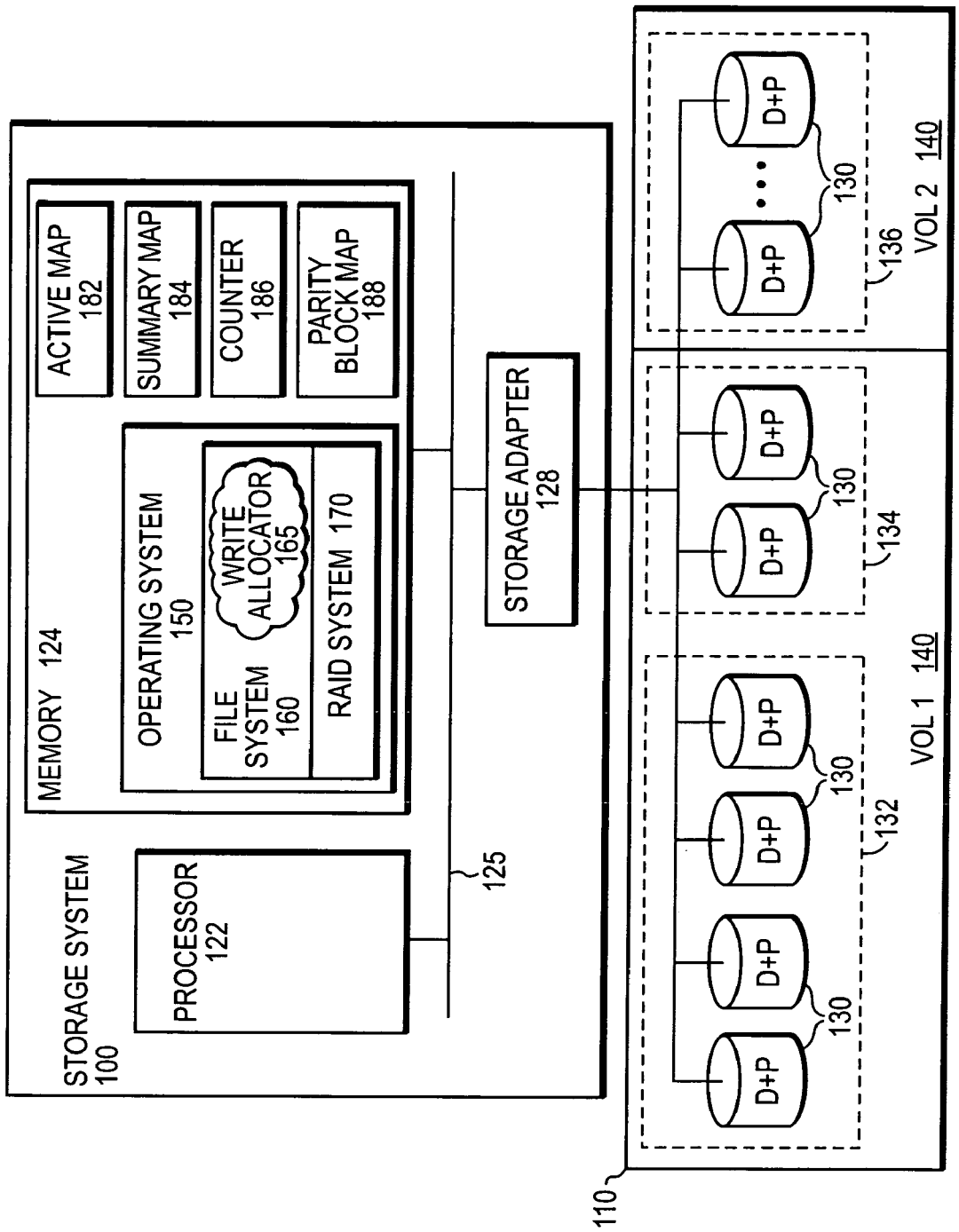
FIG. 1 is a schematic block diagram of a storage system that may be advantageously used with the present invention.

FIG. 1 is a schematic block diagram of a storage system 100 that may be advantageously used with the present invention. In the illustrative embodiment, the storage system 100 comprises a processor 122, a memory 124 and a storage adapter 128 interconnected by a system bus 125. The memory 124 comprises storage locations that are addressable by the processor and adapter for storing software program code and data structures associated with the present invention. The processor and adapter may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

A storage operating system 150, portions of which are typically resident in memory and executed by the processing elements, functionally organizes the system 100 by, inter alia, invoking storage operations executed by the storage system. The storage operating system implements a high-level module to logically organize the information as a hierarchical structure of directories, files and blocks on disks of an array. The operating system 150 further implements a storage module that manages the storage and retrieval of the information to and from the disks in accordance with write and read operations. It should be noted that the high-level and storage modules can be implemented in software, hardware, firmware, or a combination thereof.

Specifically, the high-level module may comprise a file system 160 or other module, such as a database, that allocates storage space for itself in the disk array and that controls the layout of data on that array. In addition, the storage module may comprise a disk array control system or RAID system 170 configured to compute redundant (e.g., parity) information using a redundant storage algorithm and recover from disk failures. The disk array control system ("disk array controller") or RAID system may further compute the redundant information using algebraic and algorithmic calculations in response to the placement of fixed data on the array. It should be noted that the term "RAID system" is synonymous with "disk array control system or disk array controller" and, as such, use of the term RAID system does not imply employment of one of the known RAID techniques. Rather, the RAID system of the invention employs the inventive dynamic parity distribution technique. As described herein, the file system or database makes decisions about where to place data on the array and forwards those decisions to the RAID system.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system having an on-disk format representation that is block-based using, e.g., 4 kilobyte (kB) WAFL blocks. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable to perform a storage function in a storage system, e.g., that manages file semantics and may, in the case of a file server, implement file system semantics and manage data access. In this sense, the ONTAP software is an example of such a storage operating system implemented as a microkernel and including a WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

The storage adapter 128 cooperates with the storage operating system 150 executing on the system 100 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 110. The storage adapter includes input/output (I/O) interface circuitry that couples to the disks over an I/O interconnect arrangement, such as a conventional high-performance, Fibre Channel serial link topology.

Storage of information on array 110 is preferably implemented as one or more storage "volumes" (e.g., VOL1-2 140) that comprise a cluster of physical storage disks 130, defining an overall logical arrangement of disk space. Each volume is generally, although not necessarily, associated with its own file system. The disks within a volume/file system are typically organized as one or more groups, wherein each group is comparable to a RAID group. Most RAID implementations enhance the reliability/integrity of data storage through the redundant writing of data "stripes" across a given number of physical disks in the RAID group, and the appropriate constructing and storing of parity (redundant) information with respect to the striped data.

Specifically, each volume 140 is constructed from an array of physical disks 130 that are divided into blocks, with the blocks being organized into stripes. The disks are organized as groups 132, 134, and 136. Although these groups are comparable to RAID groups, a dynamic parity distribution technique described herein is used within each group. Each stripe in each group has one or more parity blocks, depending on the degree of failure tolerance required of the group. The selection of which disk(s) in each stripe contains parity is not determined by the RAID configuration, as it would be in a conventional RAID-4 or RAID-5 array. Rather, this determination can be made by an external system, such as the file system or array controller that controls the array. The selection of which disks hold parity can be made arbitrarily for each stripe, and can vary from stripe to stripe.

In accordance with the present invention, the dynamic parity distribution system and technique distributes parity across disks of the array. The dynamic parity distribution system includes storage operating system 150 that integrates file system 160 with RAID system 170. In response to a request to store (write) data on the array, the file system determines which disks contain free blocks in a next allocated stripe of the array. There may be multiple blocks within the stripe that do not contain file system data (i.e., unallocated data blocks) and that could potentially store parity. Note that references to the file system data do not preclude data generated by other high-level modules, such as databases. One or more of those unallocated data blocks can be assigned to store parity, arbitrarily. According to the dynamic parity distribution technique, the file system determines which blocks hold parity each time there is a write request to the stripe. The technique alternately allows the RAID system to assign a block to contain parity when each stripe is written.

In a symmetric parity array, the role of each disk, i.e., whether it stores either data or parity, can vary in each stripe, while maintaining invariants that allow reconstruction from failures to proceed without knowledge of the role each disk block assumed in the array before the failure occurred. Thus symmetric parity, in this context, denotes that the RAID system 170 (or disk array controller such as, e.g., a RAID controller of a RAID array) can reconstruct a lost (failed) disk without knowledge of the role of any disk within the stripe. A typical single redundant storage algorithm, such as single parity, does not require knowledge of the relative positions of the disks in a row. Yet a symmetric double failure-correcting algorithm, such as symmetric row-diagonal (SRD) parity, does require knowledge of the relative positions of the disks in the array, but not of their roles. Furthermore, the algorithmic relationship among all the disks is symmetric. SRD parity is described in co-pending and commonly assigned U.S. Patent Application Serial No. (112056-0141) titled Symmetric Double Failure Correcting Technique for Protecting against Two Disk Failures in a Disk Array, by Peter F. Corbett et al.

The RAID system must "know", i.e., maintain information, about the location of data so that it will not be overwritten; however, the system does not need to know which block contains parity information in order to reconstruct a failed block. The RAID system simply performs XOR operations on all the other blocks, regardless of content, to reconstruct the data. Notably, the RAID system never needs to know which blocks contain parity; it only needs to know which blocks in a stripe do not contain file system data and that there are one or more such blocks in the stripe. When the RAID system writes new data to a stripe, it can choose any block that does not contain data (an unallocated data block) and place new parity information in it to restore the stripe's parity invariant, e.g., all blocks in the stripe add to zero in response to the XOR operations. The file system or database can make the determination of which block(s) in each stripe to leave available for redundant information (e.g., parity).

With single (row) parity, only one block in a stripe need be chosen to contain a value that sets the sum of the blocks in the stripe to zero. With double parity two blocks in the stripe are chosen to contain values that set the sum of the blocks within row parity sets ("rows") and diagonal parity sets ("diagonals") in the stripe to zero. Other single and double correcting algorithms may also be used advantageously with the invention, as long as they allow any one or more lost blocks to be reconstructed from the surviving blocks in each stripe, independently of whether the lost or surviving blocks contained data or redundant information. Unlike row parity, diagonal parity used in a Row-Diagonal (RD) parity technique is not symmetric, as diagonal parity is not computed for the one diagonal that does not include the diagonal parity disk. Accordingly, the RAID system needs to know of the disk that contains the diagonal parity information in order to reconstruct data using diagonal parity or to compute diagonal parity. The RD parity technique is described in U.S. patent application Ser. No. 10/035,607 titled Row-Diagonal Parity Technique for Enabling Efficient Recovery from Double Failures in a Storage Array, by Peter F. Corbett et al., filed on Dec. 28, 2001.

However, it is possible to utilize an asymmetric redundant storage algorithm, such as RD parity, in such a way as to arbitrarily select any blocks to store data or redundant/parity information in each row. Use of RD parity to compute the redundant information requires information be maintained about the position of each disk in the array. In addition, the asymmetric algorithm requires information about the particular relationship of the contents of each disk to each other disk. Specifically, the contents of some blocks that would typically contain row or diagonal parity may be fixed, setting those blocks to arbitrary data values. RD parity construction or reconstruction algorithms may then be used to determine the contents of the two redundant blocks in each stripe. While such an asymmetric algorithm can be applied in the context of dynamic parity placement, symmetric algorithms have the benefit of being simpler and more convenient to work with.

In a symmetric, double failure-correcting storage algorithm, such as SRD parity, the RAID system generates two disks worth of "redundant" information for storage in an array, wherein the redundant information (e.g., parity) is derived from both diagonal and row parity computation contributions. The RAID system computes the row parity along rows of the array and diagonal parity along diagonals of the array. However, the contents of the redundant parity information disks interact such that neither disk contains purely (solely) diagonal or row parity information; the redundant information is generated using diagonal parity in row parity computations.

A file system 160, such as the illustrative WAFL file system, typically maintains more information about the location of data on disk than a typical RAID system. The file system knows that subsets of data are allocated and thus contain file system data. The file system illustratively maintains this knowledge through block allocation information data structures, such as an active map 182 and a summary map 184. Examples of block allocation data structures, such as an active map and a summary map, that may be advantageously used with the present invention are described in U.S. Patent Application Publication No. U.S. 2002/0083037 A1, titled Instant Snapshot and published on Jun. 27, 2002, which application is hereby incorporated by reference. For example, the file system knows that there are certain blocks that contain file system data in a stripe and that cannot change. The only other information about the stripe that the file system needs to know is that all the blocks in the stripe add to zero when XOR operations are performed thereon. Therefore, any of the blocks that do not contain data (unallocated data blocks) can be modified to ensure that the blocks add to zero.

Since successful reconstruction is independent of the disk(s) chosen to hold parity information, parity disk(s) can be chosen from among free blocks by either the file system or RAID system and selection can vary from stripe to stripe, as in a RAID-5 level implementation. This, in turn, allows the file system and/or RAID system to render dynamic decisions as to where to place (distribute) parity information in either a row parity stripe arrangement or a double failure correcting parity array.

Dynamic parity distribution is based on the above-described observation about the relationship between the file system and RAID system, and, in the illustrative embodiment described herein, on the symmetric behavior of the parity algorithm. According to the inventive technique, the file system 160 maintains at least one unallocated block (two for a double failure correcting algorithm) per stripe for use by the RAID system 170. During block allocation, the file system provides an indication to the RAID system of the unallocated block(s) to be used to contain parity information. All unallocated blocks on the disks of the array are suitable candidates for file system data or parity. Notably, the unallocated block(s) used to store parity may be located in any disk and the location(s) of the unallocated block(s) can change over time. Moreover, all blocks in a RAID group are available for potential allocation, since parity is not held in fixed locations. In practice, this means that all blocks, including those that were "hidden" in the parity disk are available to the file system 160 for allocation in volume block number space. The file system has knowledge of the locations of allocated data so that it can leave (reserve) sufficient space for parity in every stripe.

Figure 2:
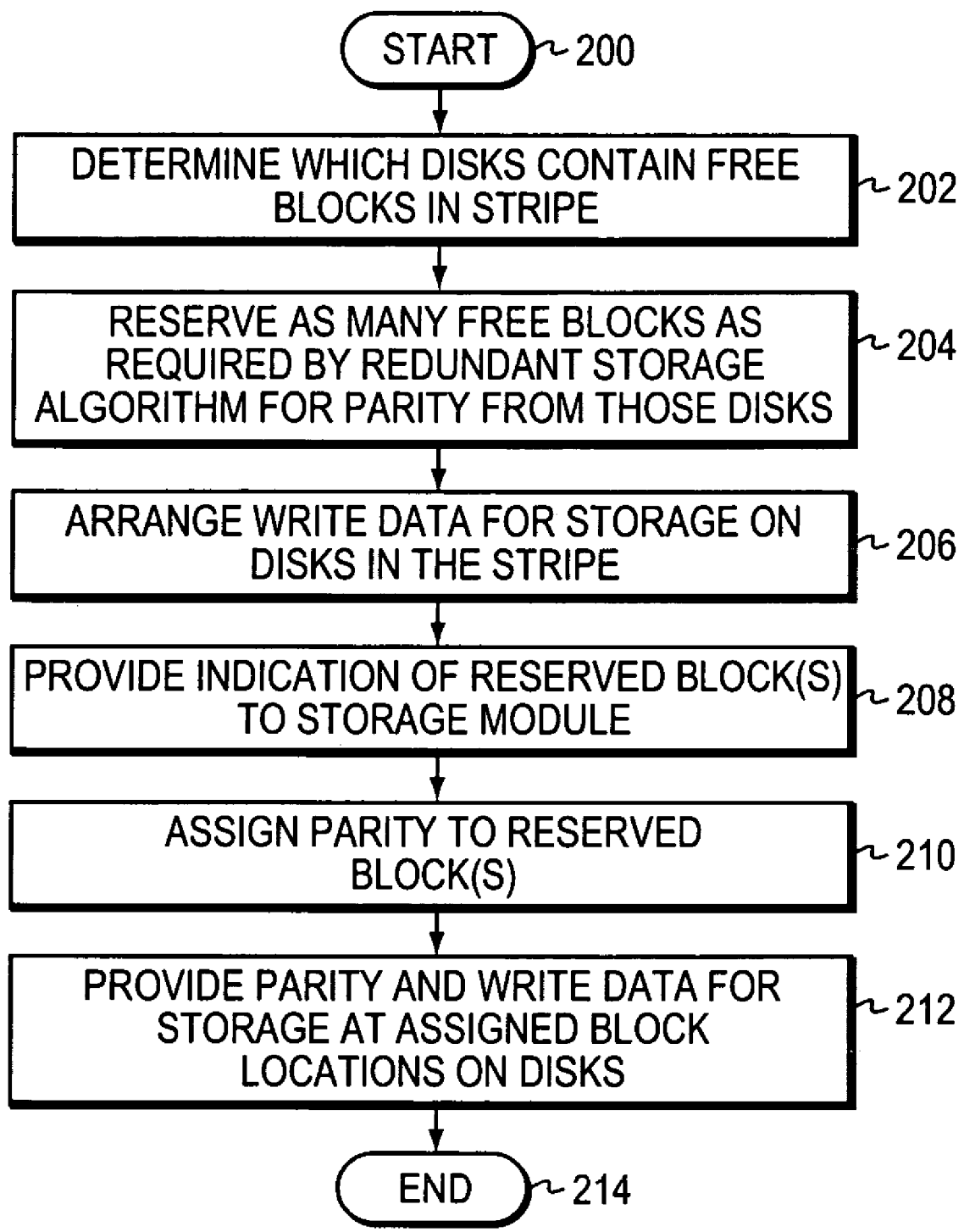
FIG. 2 is a flowchart illustrating a sequence of steps for distributing parity among disks in accordance with a dynamic parity distribution technique of the present invention.

FIG. 2 is a flowchart illustrating a sequence of steps for distributing parity among disks of an array in accordance with the dynamic parity distribution technique of the present invention. According to the technique, the file system 160 indicates to the RAID system 170 which block(s) in a next allocated stripe holds parity each time there is a write operation (request) involving write data to the stripe. The sequence starts at Step 200 and proceeds to Step 202 where the file system (high-level module) determines which disks contain free blocks in the stripe in response to the write request. The stripe will contain at least one unallocated block, which is the parity block, and one or more unallocated blocks that are freed data blocks. All blocks contribute to, e.g., even parity, so the parity block(s) and the freed data blocks are all equivalent. In Step 204, the file system reserves as many free blocks as required by the redundant storage algorithm to store parity, with the remaining unallocated blocks used to store data.

In Step 206, write allocation code ("write allocator 165") of the file system arranges (i.e., "lays out") the write data for storage on the disks in the stripe. The RAID system provides topology information to the file system about the disks of each group 132-136 that allows the write allocator to render optimal and correct write allocation decisions. Write allocation is directed to one group at a time to enable writing of full stripes across the disks of the group. In Step 208, the file system provides an indication of the reserved block(s) to the RAID system (storage module) via, e.g., a write request message and, in Step 210, the RAID system assigns parity to the reserved block(s). In Step 212, the RAID system provides the parity information (and write data) to a disk driver system (not shown) for storage at the assigned block locations on the disk. The sequence then ends at Step 214.

Note that in a preferred embodiment of the inventive dynamic parity distribution technique, the file system 160 simply tracks the locations of allocated file data blocks. The RAID system 170 loads the reserved block(s) with parity information, but the file system does not need to know which block(s) contain parity. The RAID system knows which blocks are being written, so that it manages changes in the parity relationships. However, in an alternate embodiment, the file system may track the reserved blocks using parity reservation information maintained in a separate parity block map structure 188. The parity block map 188 requires constant update whenever a parity block is reassigned.

Note also that the symmetry property with respect to reconstruction is very helpful, as it makes it possible to use the same algorithm to compute the lost data or redundant information, regardless of which disk(s) fail. However, even in the case where an asymmetric algorithm is used to correct one or more failures, knowledge of the position of the redundant information in each stripe is not required to fully reconstruct the lost contents of the stripe, as long as the position and role of each disk are known with respect to the algorithm used.

Dynamic parity distribution may be employed to compensate for uneven distribution of write data across the disks 130 of array 300 to thereby evenly distribute (i.e., balance) the data access load across the disks. As the file system attempts to fully populate each stripe with data, the RAID system 170 can reduce the data access load by distributing parity to a "hot" disk, i.e., a disk that is more heavily utilized than other disks. As noted, any unallocated block can be used to contain parity. At the point of writing to a stripe, the file system chooses one or two of the unallocated blocks to hold parity from among the disks that contain the most data to thereby reassign future read workload away from a heavily utilized (i.e., "hot") disk. Here, the file system may maintain a counter 186 for each disk 130 to keep track of the amount of data that has been newly allocated on the disk. Each counter may be stateless; when the operating system reboots, each counter is set to zero. This arrangement tends to equalize the amount of data on each disk over time.

The file system 160 may render further parity distribution decisions, depending on the situation. For example, assume a new disk is added to a RAID group. Before the disk is added to the group, it is preferably zeroed so that it is neutral with respect to each stripe's parity invariant. Once the disk is added, the file system has a new set of free blocks at its disposal. The file system may proportionally choose to use the free block(s) or the previous parity block(s) for parity. This, in turn, allows new write data to be allocated in the old parity locations on each stripe, thus distributing any future read load across the array.

Dynamic parity distribution has interesting implications operating in degraded mode, e.g., after one or more disks have failed. When running in a degraded state, it may be possible to only reconstruct the lost data blocks, relocating them on the surviving disks where those disks previously held parity. This does not restore data protection to those stripes, but it does improve the performance of subsequent read accesses. Operating in such a degraded state requires some interaction between the RAID system 170 and a "client" of the RAID system (such as the file system 160) or requires re-identification of the relocated blocks at the interface to the RAID system. Otherwise, high-level modules of the storage operating system 150 would not be able to locate those relocated data blocks.

There are various "degrees of freedom" that can be exploited by the file system using the dynamic distribution technique. For example, the dynamic distribution technique may apply to an array where there are multiple disk sizes in the same group 132-136. If parity were evenly distributed across the disks, the larger disks would realize more load simply because they contain more data. Dynamic distribution can also use disk size as weighting for the parity distribution system so that the blocks available for data distribution are more evenly allocated across the group.

The dynamic parity distribution technique also allows the performance of various other arrangements, such as biasing parity distribution based on the actual measured read load of every disk. If data is mostly read, then biasing to even the read load across all of the disks may be near optimal. In most cases, biasing is employed to balance the total load across all disks, including the read and write load. This can be accomplished by taking advantage of the average behavior across a large data set and simply balancing the number of data blocks across the disks. Alternatively, an algorithm for biasing parity distribution involves adding for allocated data and subtracting for unallocated blocks, while changing the amounts added and subtracted to bias data for storage on one disk or another of the array. This alternate embodiment includes the use of counters that are maintained close to a predetermined value (e.g., zero) to thereby determine on which disk to store the next data blocks.

For example, a counter for a disk is incremented each time a data block is allocated to the disk where there previously was no data block. Similarly, the counter is decremented whenever a data block is freed or parity block is allocated to the disk. The ratio of the amounts of increment to decrement for each block allocation or de-allocation determines the ratio of data to parity and free blocks on each disk. Keeping the counter close to zero keeps the ratio of data to non-data blocks close to the desired value. This technique can be used to balance the load across all disks, even if the disks are of different sizes.

Biasing with respect to balancing data is handled differently where a group has fewer, but larger disks. Essentially, this enables the file system to balance the parity information on the larger portions of disks within a group 132-136. Balancing of information is done on a stripe-by-stripe basis, with the dynamic distribution technique being used to bias data or parity in such a way as to balance the read load even though the disks are of different sizes. In the illustrative embodiment, the file system may implement a balancing algorithm to render balancing decisions when determining the block locations of the data and parity information on the disks. The illustrative balancing algorithm includes factors such as the different sizes of the disk/stripes, measurement of I/O operations to each disk and adjusting the I/O rates accordingly, and adjusting for the speed of each disk to thereby allow utilization of disks having different speeds.

The parity distribution technique described herein is particularly useful for systems having fewer disks yet that want to utilize all read operations per second (ops) that are available from those disks. Performance of smaller arrays is bounded by the ops that are achievable from disks (disk-bound). Yet even in large arrays where disks get larger, because of reconstruction times, the tendency is to reduce the number of disks per group 132-136. This results in an increase in redundancy overhead (the percentage of disks in a group devoted to redundancy increases). Therefore, it is desirable to take advantage of the read ops available in those redundant disks. Another advantage of the parity distribution technique is that reconstruction and/or recovery occurs "blindly" (i.e., without knowing the roles of the disks). The dynamic parity distribution system and technique applies to single disk failure correction and can be extended to apply to double (or greater) disk loss protection.

Dynamic parity distribution may be advantageously used with arrays having low numbers of large disks, since the technique balances data across the array. Using larger disks is required to get reasonable capacity, but that also means using smaller groups 132-136 to limit reconstruction time. If a 14-disk configuration uses two groups and one spare, then a relatively substantial percentage (e.g., over 20%) of the disks are unavailable for use in storing or retrieving data. Configurations with eight disks are even worse, e.g., one spare and one parity disk amount to 25% overhead. Dynamic parity distribution could make the two parity disks and, potentially, the spare disk in the 14-disk configuration available for data. This overhead reduces the array's effective read capacity.

It will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 100. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system adapted to distribute redundant information across disks of an array, the system comprising:
a storage operating system configured to invoke storage operations executed by a storage system, the storage operating system further configured to manage storage of information, including the redundant information and data, on blocks of the disks in response to disk access operations, the storage operating system including a storage module adapted to compute the redundant information in response to a layout of the data in stripes across the disks, the storage operating system maintaining at least one unallocated block per stripe for use by the storage module to store the computed redundant information, wherein the at least one unallocated block used to store the redundant information is located in any disk and wherein the location of the at least one unallocated block used to store the redundant information is dynamically allocated in a non-fixed pattern by the storage module before each write request is completed for each stripe.

2. The system of claim 1 wherein the storage module is a disk array controller configured to compute the redundant information and reconstruct blocks lost due to failure of one or more of the disks.

3. The system of claim 1 wherein the storage module is a RAID system configured to compute the redundant information and reconstruct blocks lost due to failure of one or more of the disks.

4. The system of claim 3 wherein the storage operating system is further configured to implement a high-level module that maintains information about locations of the data on the disks.

5. The system of claim 4 wherein the high-level module is a file system or database adapted to control layout of the data on the disks.

6. The system of claim 5 wherein the storage operating system integrates the file system or database with the RAID system.

7. The system of claim 6 wherein the file system or database is configured to determine block locations of the data on the disks and the RAID system is configured to determine the block locations of the redundant information on the disks.

8. The system of claim 6 wherein the file system or database is configured to determine block locations of the data and the redundant information on the disks.

9. The system of claim 8 wherein the file system or database renders balancing decisions to determine the block locations of the data and the redundant information on the disks.

10. The system of claim 9 wherein the balancing decisions comprises one of different sizes of disks, different speeds of disks, and whether a disk is more heavily utilized than other disks.

11. The system of claim 8 further comprising block allocation map structures used by the file system to determine the block locations of the data and the redundant information on the disks.

12. The system of claim 11 wherein the redundant information is parity.

13. The system of claim 1 wherein the storage module selects the at least one unallocated block to store the redundant information and wherein the storage module computes the redundant information using a redundant storage algorithm.

14. The system of claim 13 wherein the selection of the at least one unallocated block to store redundant information is independent of the redundant storage algorithm.

15. The system of claim 14 wherein the redundant storage algorithm is an asymmetric algorithm.

16. The system of claim 14 wherein the redundant storage algorithm is a symmetric algorithm.

17. The system of claim 16 wherein the redundant information is parity.

18. The system of claim 13 wherein the at least one unallocated block used to store the redundant information comprises two or more unallocated blocks used to store the redundant information.

19. The system of claim 18 wherein the selection of the unallocated blocks to store redundant information is independent of the redundant storage algorithm used to compute the redundant information.

20. The system of claim 19 wherein the redundant storage algorithm depends on positions of the blocks in the array.

21. The system of claim 20 wherein the redundant storage algorithm is a symmetric and wherein the redundant information is parity.

22. The system of claim 20 wherein the redundant storage algorithm is an asymmetric algorithm and wherein the redundant information is parity.

23. The system of claim 1, wherein the non-fixed pattern is created by the redundant information being stored in any block remaining after the data is allocated to blocks of the stripe.

24. A method for distributing redundant information across disks of an array, comprising:
dividing each disk into blocks, the blocks being organized into stripes such that each stripe contains one block from each disk;
selecting one or more blocks in a stripe layout of the stripe not used to contain data to contain the redundant information, wherein the selected one or more blocks used to contain the redundant information are located in any disk and wherein the location of the selected one or more blocks used to contain the redundant information is dynamically allocated in a non-fixed pattern before each write request for each stripe is completed;
computing the redundant information based on contents of all other blocks in the stripe layout, regardless of whether the blocks contain data; and
writing the data in one or more allocated blocks and the redundant information in the one or more selected blocks of the stripe that is written across the disks of the array.

25. The method of claim 24 further comprising the step of determining which block in a stripe contains redundant information each time there is a write request to the stripe.

26. The method of claim 25 further comprising the step of assigning a block to contain redundant information when each stripe is written.

27. The method of claim 26 wherein the step of determining is performed by a high-level module of a storage system and wherein the steps of computing and assigning are performed by a storage module of the storage system.

28. The method of claim 27 further comprising:
maintaining, by the high-level module, at least one unallocated block per stripe for use by the storage module; and
providing an indication from the high-level module to the storage module of the unallocated block to contain parity.

29. The method of claim 28 further comprising the step of reconstructing, using the storage module, a block that is lost due to failure of a disk.

30. The method of claim 27 wherein the high-level module is a file system and wherein the storage module is one of an array controller and a RAID system.

31. The method of claim 30 wherein the step of computing comprises computing the redundant information in response to the stripe layout of the data in stripes across the disks.

32. The method of claim 31 wherein the step of computing further comprises computing the redundant information using algebraic and algorithmic calculations in response to the placement of the data on the array.

33. Apparatus for distributing redundant information across disks of an array, the apparatus comprising:
means for dividing each disk into stripes, with each stripe containing one block from each disk;
means for selecting one or more blocks in a stripe layout of the stripe not used to contain data to contain redundant information, wherein the selected one or more blocks used to contain the redundant information are located in any disk and wherein the location of the selected one or more blocks used to contain the redundant information is dynamically allocated in a non-fixed pattern before each write request for each stripe is completed;
means for computing the redundant information based on contents of all other blocks in the stripe layout, regardless of whether the blocks contain data; and
means for writing the data in one or more allocated blocks and the redundant information in the one or more selected blocks of the stripe that is written across the disks of the array.

34. The apparatus of claim 33 further comprising means for determining which block or blocks in a stripe holds redundant information each time there is a write operation to the stripe.

35. A computer readable medium containing executable program instructions for distributing parity across disks of an array, the executable instructions comprising one or more program instructions for:
dividing each disk into stripes, with each stripe containing one block from each disk;
selecting one or more blocks in a stripe layout of the stripe not used to contain data to contain parity, wherein the selected one or more blocks used to contain the parity are located in any disk and wherein the location of the selected one or more block used to contain the parity is dynamically allocated in a non-fixed pattern before each write request for each stripe is completed;
computing the parity based on contents of all other blocks in the stripe, regardless of whether the blocks contain data; and
writing the data in one or more allocated blocks and the redundant information in the one or more selected blocks of the stripe that is written across the disks of the array.

36. A method for distributing redundant information across disks of an away with a plurality of blocks on each disk, comprising:
determining which blocks are unallocated in a stripe across the disks;
reserving unallocated blocks for storing the redundant information in one or more reserved unallocated blocks;

arranging data in the stripe for the data to be stored in one or more allocated blocks across the disks of the array;

assigning the redundant information in a non-fixed pattern to the one or more reserved unallocated blocks; and writing the data in the allocated blocks and the redundant information in the one or more reserved unallocated blocks as the stripe across the disks of the array.

37. The method of claim 36, further comprising:
storing parity information as the redundant information in the one or more reserved unallocated blocks.

38. The method of claim 36, further comprising:
adding a disk to the array;
storing a second stripe across the array by determining one or more unallocated blocks across the array including the added disk, and writing the data to allocated blocks and the redundant information to the one or more unallocated blocks of the second stripe.

39. An apparatus for distributing redundant information across disks of an array with a plurality of blocks on each disk, comprising:
means for determining which blocks are unallocated in a stripe across the disks;
means for reserving unallocated blocks for storing the redundant information in one or more reserved unallocated blocks;
means for arranging data in the stripe for the data to be stored in one or more allocated blocks across the disks of the array;
means for assigning the redundant information in a non-fixed pattern to the one or more reserved unallocated block; and
means for writing the data in the allocated blocks and the redundant information in the one or more reserved unallocated blocks as the stripe across the disks of the array.

40. The apparatus of claim 39, further comprising:
means for storing parity information as the redundant information in the one or more reserved unallocated blocks.

41. The apparatus of claim 39, further comprising:
means for adding a disk to the array;
means for storing a second stripe across the array by determining one or more unallocated blocks across the array including the added disk, and writing the data to allocated blocks and the redundant information to the one or more unallocated blocks of the second stripe.

42. A system for distributing redundant information across disks of an array with a plurality of blocks on each disk, comprising:
a storage operating system configured to invoke storage operations executed by a storage system, the storage operating system further configured (i) to determine which blocks are unallocated in a stripe across the disks, (ii) to reserve unallocated blocks for storing the redundant information in one or more reserved unallocated blocks, (iii) to arrange data in the stripe for the data to be stored in one or more allocated blocks across the disks of the array, (iv) to assign the redundant information in a non-fixed pattern to the one or more reserved unallocated block, and (iv) to write the data in the allocated blocks and the redundant information in the one or more reserved unallocated blocks as the stripe across the disks of the array.

43. The system of claim 42, wherein the redundant information is parity information.

44. A computer readable medium containing executable program instructions for distributing parity across disks of an array, the executable instructions comprising one or more program instructions for:
determining which blocks are unallocated in a stripe across the disks, where each disk has a plurality of blocks;
reserving unallocated blocks for storing the redundant information in one or more reserved unallocated blocks;
arranging data in the stripe for the data to be stored in one or more allocated blocks across the disks of the array; and
assigning the redundant information in a non-fixed pattern to the one or more reserved unallocated block; and
writing the data in the allocated blocks and the redundant information in the one or more reserved unallocated blocks as the stripe across the disks of the array.

45. A method for distributing redundant information across disks of an array with a plurality of blocks on each disk, comprising:
allocating data to blocks in a stripe layout, where the stripe layout represents a stripe across the disks of the array;
reserving unallocated blocks for storing the redundant information in one or more reserved unallocated blocks;
assigning the redundant information to the one or more reserved unallocated blocks in a non-fixed pattern; and
writing the data in the allocated blocks and the redundant information in the one or more reserved unallocated blocks as the stripe across the disks of the array.

46. The method of claim 45, further comprising:
storing parity information as the redundant information in the one or more reserved unallocated blocks.

47. The method of claim 45, further comprising:
adding a disk to the array;
storing a second stripe across the array by determining one or more unallocated blocks across the array including the added disk, and writing the data to allocated blocks and the redundant information to the one or more unallocated blocks of the second stripe.

48. The method of claim 45, further comprising:
computing the redundant information based on contents of other blocks in the stripe layout, regardless of whether the blocks contain data or are empty.

49. The method of claim 48, wherein the step of computing uses a symmetric algorithm and wherein the redundant information is parity.

50. The method of claim 48, wherein the step of computing uses an asymmetric algorithm and wherein the redundant information is parity.

51. The method of claim 45, wherein the non-fixed pattern is created by the redundant information being stored in any block remaining after the data is allocated to blocks of the stripe.

* * * * *

UNITED STATES PATENT AND TRADEMARK OFFICE
CERTIFICATE OF CORRECTION

PATENT NO. : 7,328,305 B2
APPLICATION NO. : 10/700227
DATED : February 5, 2008
INVENTOR(S) : Steven R. Kleiman et al.

It is certified that error appears in the above-identified patent and that said Letters Patent is hereby corrected as shown below:

Col. 14, Line 61: should read -- across disks of an ~~away~~ array with a plurality of blocks on each --.

Signed and Sealed this

Fourteenth Day of October, 2008

JON W. DUDAS
*Director of the United States Patent and Trademark Office*